United States Patent [19]

Mishima et al.

[11] 3,951,925

[45] Apr. 20, 1976

[54] PROCESS FOR PRODUCING IMPROVED VINYL CHLORIDE POLYMERS

[75] Inventors: Sanetsugu Mishima; Tsutomu Matsubara; Hiroyuki Fujii; Kazumasa Funada, all of Minamata; Masataka Torigoe, Hoya, all of Japan

[73] Assignee: Chisso Corporation, Osaka, Japan

[22] Filed: July 13, 1973

[21] Appl. No.: 378,858

[30] Foreign Application Priority Data

Oct. 28, 1970    Japan.............................. 45-94913

[52] U.S. Cl. .............................. 526/72; 260/2.5 P; 526/82; 326/75; 526/78; 526/86; 526/219; 526/232; 526/227; 526/266; 526/318; 526/343; 526/345

[51] Int. Cl.² .................... C08F 1/11; C08F 3/34

[58] Field of Search............ 260/92.8 W, 86.3, 78.5, 260/87.5 R, 87.1, 87.7, 85.5 XA

[56] References Cited
UNITED STATES PATENTS

| | | | |
|---|---|---|---|
| 2,652,392 | 9/1953 | Hohenstein......................... | 260/86.7 |
| 3,558,584 | 1/1971 | Thomas............................. | 260/92.8 R |
| 3,687,917 | 8/1972 | Wisseroth........................ | 260/85.5 XA |

Primary Examiner—Christopher A. Henderson, Jr.
Attorney, Agent, or Firm—Fred Philpitt

[57] ABSTRACT

Polymer or copolymer of vinyl chloride having superior properties can be produced by suspension-polymerizing vinyl chloride or a mixture thereof with another vinyl monomer, at first, in the presence of an oil-soluble radical initiator, and thereafter, when the percentage of polymerization of the resulting polymer has reached about 15% to about 80%, subjecting the polymer to a further polymerization in the presence of a water-soluble radical initiator.

The product thus obtained has both the merits resulting from suspension polymerization and emulsion one. It has an extremely high absorptivity of plasticizer, easy processability, and film made therefrom has substantially no fish eye.

6 Claims, No Drawings

PROCESS FOR PRODUCING IMPROVED VINYL CHLORIDE POLYMERS

RELATED APPLICATION

This application is related to Application Ser. No. 190,328 filed on Oct. 18, 1971 (now abandoned) and since the present application is being filed during the pendency of Ser. No. 190,328 the benefits affoded by 35 USC 120 are claimed with respect to it.

DESCRIPTION OF THE INVENTION

This invention relates to a process for producing improved vinyl chloride polymers. More particularly, it relates to a process for producing vinyl chloride polymers having superior properties, by polymerizing vinyl chloride or a mixture of vinyl chloride and another vinyl monomer copolymerizable therewith, by the successive use of an oil-soluble radical initiator and a water-soluble radical initiator.

As for the process for polymerizing vinyl chloride, there have been generally known various processes such as suspension-, mass-, emulsion-, solution-polymerizations, etc. Among these processes, the suspension polymerization process has been broadly utilized as a commerical one, due to such advantages as easy operation of polymerization, easy handling of product, and low cost, etc. However, the process has such drawbacks in respect of the quality of product as insufficient processability and absorptibity of plasticizer, formation of fish eyes, etc., and a further improvement has been strongly desired.

U.S. Pat. No. 2,652,392 discloses a process of polymerization in aqueous suspension of unsaturated the manufacturing cost of product is more expensive than that according to suspension one, and also it is inevitable that impurities such as an emulsifier, a salting-out agent, etc. remain in the product, and hence the heat stability, electric resistance, etc. of product are inferior. Particularly in respect of the ease in handling of product, the process is much inferior to suspension polymerization process.

The object of this invention is to provide a process for producing vinyl chloride polymers which are easy to handle similarly to suspension-polymerized product, and also are much superior in processability, foaming characteristic, etc., and in which process the above-mentioned drawbacks encountered in cases of the usual emulsion- or suspension-polymerization are overcome, and also any cumbersome operation such as salting-out is unneccessary.

The present inventors have found that the above-mentioned object can be achieved by successively using a water-soluble radical initiator in an aqueous suspension polymerization system using an oil-soluble radical initiator, and thus completed the present invention. That is to say, the present invention resorts to a process for producing vinyl chloride polymers having improved properties which comprises subjecting vinyl chloride or a mixture of vinyl chloride and another vinyl monomer copolymerizable therewith to an aqueous suspension polymerization in the presence of an oil-organic compounds such as styrene, in the presence of a monomer-soluble polymerization catalyst and of a calcium phosphate as suspension stabilizer, in which up to 0.01% by weight of the system of a water-soluble persulphate is added to the aqueous suspension. Such addition of a small amount of a water-soluble persulfate is carried out in order to prevent pearls from caking together in the pearl polymerization, and is effective for monomer-soluble polymers such as polystyrene. However, such a problem does not occur in the case of monomer-insoluble polymers such as polyvinyl chloride, and also, no improvement in properties of polymers can be expected from addition of such a small amount of persulphate. Mass polymerization process is similar to suspension one in respect of the polymerization mechanism, and hence it also has a necessity of further improvement as mentioned above.

Further, emulsion polymerization process has been also broadly carried out, and it is useful for pastes since a polymer of fine particles can be obtained in respect of the quality of product, but this process has such drawbacks that soluble radical initiator, and when the percentage of polymerization of the resulting polymer has reached about 15% to about 80%, subjecting the polymer to a further polymerization in the presence of a water-soluble radical initiator.

The process of the present invention will be further explained. In the first place, the polymerization of vinyl chloride (or a mixture of vinyl chloride and another vinyl monomer copolymerizable therewith) is initiated in an aqueous suspension polymerization system in which an oil-soluble radical initiator and a dispersion-stabilizer generally used are added. The amount of aqueous medium, usually water, added is 100 to 400 parts based upon 100 parts by weight of the monomer. Thus, particles of polyvinyl chloride in a state of suspension are formed. At a stage after lapse of a specified period of time, a water-soluble radical initiator is added to the polymerization system to allow polymerization by means of the water-soluble radical initiator to proceed inside the pores or on the surfaces of the polyvinyl chloride particles formed in advance.

As the oil-soluble radical initiators to be used in the present invention, there can be illustrated known initiators, that is, peroxide compounds such as dilauroyl peroxide, dibenzoyl peroxide, di-2-ethylhexyl peroxide, 3,5,5-trimethylhexanoyl peroxide, 2,4-dichlorobenzoyl peroxide, etc.; azo compounds such as azobisisobutyronitrile, 2,2'-azobis-2,4-dimethylvaleronitrile, 2,2'-azobis-4-methoxy-2,4-dimethylvaleronitrile; percarbonate compounds such as diisopropyl peroxycarbonate, disecondary butyl peroxydicarbonate; perester compounds such as t-butyl peroxypivalate; sulfonyl peroxide compounds such as acetyl cyclohexylsulfonyl peroxide; etc. The amount of these oil-soluble radical initiators to be added varies depending upon the kind of the initiators; it is usually in the range of 0.003 – 0.5 % by weight based on the weight of the monomer used, preferably 0.005 – 0.2% by weight.

As the water-soluble initiators, there can be illustrated known initiators, that is, inorganic compounds such as potassium persulfate, ammonium persulfate, hydrogen peroxide; organic azo compounds such as 2,2'-azobis (2-amidinopropane hydrochloride); etc. The amount of these water-soluble radical initiators to be added is in the range of more than 0.01 to 0.3% by weight based upon the total weight of the polymerization system, preferably 0.02 to 0.2% by weight.

As the dispersion-stabilizers, there can be illustrated, for example, synthetic, high molecular weight substances such as polyvinyl alcohol, methyl cellulose, polyvinyl pyrrolidone, polyvinyl methyl ether and vinyl acetate - maleic anhydride copolymer; natural, high molecular weight substances such as starch and gelatine; water-insoluble, inorganic substances such as tricalcium phosphate, calcium oxalate, barium sulfate and bentonite. To the dispersion-stabilizers can be further added as particle-conditioning agents, nonionic surfactants such as sorbitan derivatives, polyethylene glycol derivatives, polypropylene glycol derivatives, copolymer of ethylene glycol and propylene glycol, and its derivatives. The above-mentioned simultaneous use of particle-conditioning agent is effective in preventing the separation of emulsion-polymerized particles, particularly when the proportion of the polymerization effected by the water-soluble radical initiator is larger than that effected by the oil-soluble one. Further, the size of particles formed can be adjusted by the amount of dispersion-stabilizer added initially.

The amount of the dispersion-stabilizer to be added varies depending upon the aimed size of particles formed, and usually it is suitably in the range of 0.01 – 0.5% by weight based on the weight of the monomer.

The present invention can be applied as well not only to the homopolymerization of vinyl chloride but also to the copolymerization of 80% by weight or more of vinyl chloride with less than 20% by weight of another vinyl monomer.

The vinyl monomers copolymerizable with vinyl chloride include vinyl esters such as vinyl acetate, vinyl stearate, etc.; acrylic esters such as methyl acrylate, ethyl acrylate, etc.; maleic or fumaric esters such as dimethyl maleate, dimethyl fumarate, etc.; vinyl ethers such as vinyl octyl ether, vinyl cetyl ether, etc.; vinylidene chloride; acrylonitrile; monoolefins such as ethylene, propylene, etc.; and the mixtures thereof.

The polymerization temperature to be used in the process of the present invention can be in the range of 30°– about 70°C. So far as the temperature is in this range, it can be varied in the course of the polymerization.

For example, the polymerization by the successive use of a water-soluble catalyst can be carried out more effectively by suspension-polymerizing vinyl chloride by the use of an oil-soluble radical initiator having a low temperature activity, then elevating the polymerization temperature to a higher one in the course of the polymerization to decompose and deactivate the initiator, followed by adding a water-soluble radical initiator to effect a subsequent polymerization. The time at which a water-soluble radical initiator is added in the process of this invention, is desirably a time in the course of the polymerization by means of an oil-soluble radical initiator, that is, the time when the percentage of polymerization (the proportion of formed polymer to fed monomer in the first suspension polymerization) has reached 15% to 80%. It is also possible to add two or more divided portions of the water-soluble radical initiator and vinyl chloride monomer. If the water-soluble radical initiator is added when the percentage of polymerization does not reach 15%, the polymer often agglomerates as described below in the Controls, and it is difficult to obtain suspension-polymerized particles in a stable state. Also, if the water-soluble radical initiator is added after the percentage of polymerization has exceeded 80%, the characteristic, polymerized particles aimed in this invention, cannot be obtained.

Further, it is also possible to add a compound capable of deactivating the initially added oil-soluble radical initiator, for example, alkaline substances such as sodium hydroxide or reducible substances such as hydroxylamine in case where acetylcyclohexanesulfonyl peroxide, isopropyl peroxydicarbonate, etc. are used as an oil-soluble radical initiator, just before the water-soluble radical initiator is added, or alternatively to initially add an oil-soluble radical initiator having a low temperature acttivity, and then add a water-soluble radical initiator when the activity of the former initiator has been practically lost, whereby the subsequent polymerization can be allowed to proceed substantially by means of the water-soluble radical initiator, alone.

The termination of polymerization in the process of this invention can be carried out at the time when the pressure inside the polymerization vessel has been reduced to some extent, as carried out in the usual suspension polymerization process, but the termination time is not always limited only to such a time.

As described above, according to the process of this invention, characteristic products which can not be obtained according to the conventional suspension polymerization or emulsion polymerization, can be obtained by properly selecting the kind and amount of the oil-soluble radical initiator to be initially added, and the kind, amount and time of addition, of the water-soluble radical initiator to be added in the course of polymerization.

Next, the characteristic features of the process of this invention will be enumerated below.

1. The manufacturing cost is not so different from those in the usual suspension polymerization process.
2. In spite of using a water-soluble initiator, no emulsifier is necessary, and hence such an operation as salting-out is unnecessary.
3. The form of the product is similar to those of the usual, suspension-polymerized products, and the drying of the product can be carried out readily by utilizing the drying apparatus used in the conventional suspension polymerization as it is.
3. The polymerization degree of product can be adjusted optionally.
5. In respect of the quality of product, there can be obtained a product furnished with both the superior properties unique to those based upon emulsion polymerization and the superior properties unique to those based upon suspension polymerization, and the proportion of both the properties can be optionally adjusted according to the purposes to which the product is used.
6. The product has a superior foaming ability similarly to emulsion-polymerized products, and hence a foamed leather having a good touch can be obtained.
7. The product has a very excellent absorption for plasticizer which cannot be obtained according to the conventional suspension polymerization process.
8. Substantially no fish eye is formed, when the product is used as a component of soft or hard polyvinyl chloride resin.
9. The product has a granular form similarly to the conventional suspension-polymerized products, and it is not only easy in handling, but also much superior in processability. Thus, it is possible to shorten the time of processing step. Further, due to the superior processability, the processing of even a product having a higher polymerization degree can be also readily carried out.

As described above, the process of this invention has various advantages, and is important commercially.

The present invention will be further illustrated by the following examples.

Example 1 and Control 1

To 100L capacity stainless steel polymerization vessel were fed 40 kg of deionized water, 20 g of dilauroyl peroxide (which will be hereinafter abbreviated to LPO) as an oil-soluble radical initiator and 20 g of polyvinyl alcohol having a saponification degree of 80% as a suspension stabilizer. After purging of the air in the vessel, 20 kg of vinyl chloride was fed. Polymerization was initiated at 52°C with stirring. After 8 hours, 3% aqueous solution of 20 g of potassium persulfate (which will be hereinafter abbreviated to KPS) as a water-soluble radical initiator was introduced under pressure. The amount of KPS added was 0.033% by weight based upon the total weight of the polymerization system. After 16 hours (when the inner pressure lowered to 5 kg/cm² gauge), polymerization was terminated, and unreacted gas was discharged. The resulting polymer was then washed with water and dried. The percentage of polymerization was 88%.

As a control experiment, polymerization was carried out using an oil-soluble radical initiator alone. This polymerization was different from the above-mentioned one, in that no KPS catalyst was introduced under a pressure in the course of polymerization, but 30 g of LPO was used. After 165 hours when the inner pressure lowered to 5 kg/cm² gauge, polymerization was terminated, and the resulting polymer was treated as described above. The percentage of polymerization was 89%. The properties of the two polymers thus obtained are shown in Table 1.

Examples 2 – 5, Control 2 and Reference 1

To a 200 l capacity stainless steel polymerization vessel was fed 100 kg of deionized water. 25 g of polyvinyl alcohol having a saponification degree of 80% as a dispersing agent was then added and dissolved with stirring. After purging of the air in the system, there were added 5.0 g of isopropyl peroxydicarbonate (which will be hereinafter abbreviated to IPP), and then 50 kg of vinyl chloride monomer with stirring. The inner temperature was elevated to 57°C, and polymerization was initiated. When the time as shown in Table 2 elapsed, 5% aqueous solution of 50 g of KPS was added and polymerization was continued. The amounts of KPS added was 0.033% by weight based upon the total weight of the polymerization system. When the inner pressure reached 5 kg/cm² (gauge), polymerization was terminated. Unreacted gas was then recovered, and the content was washed with water, dehydrated and dried.

Further, as controls, separate polymerizations were carried out under the same conditions except that these polymerizations were terminated at the time of adding a water-soluble catalyst to observe the percentages of polymerization at this time. These results are shown in Table 2.

Table 2

| | Time[1] of KPS addition (hrs.) | Percentage of polymerization at the time described left (%) | Final percentage of polymerization (%) | Average polymerization degree ($\bar{p}$) | Particle size distribution (pass %) | | | | Plasti-[3] cizer-retaining amount |
|---|---|---|---|---|---|---|---|---|---|
| | | | | | 42 mesh | 60 mesh | 100 mesh | 200 mesh | |
| Reference 1 | 2 | 11.4 | 88.7 | agglom-[2] erated | — | — | — | — | — |
| Example 2 | 5 | 30.5 | 89.6 | 980 | 100 | 99.6 | 59.2 | 1.2 | 62 |
| " 3 | 8 | 47.1 | 90.8 | 1,000 | 100 | 99.7 | 58.8 | 1.1 | 46 |
| " 4 | 12 | 69.8 | 90.1 | 1,020 | 100 | 99.6 | 63.5 | 1.2 | 38 |
| " 5 | 14 | 86.2 | 89.6 | 1,010 | 100 | 99.8 | 61.2 | 1.3 | 27 |
| Control 2 | No addition | — | 90.5 | 1,010 | 100 | 99.7 | 60.6 | 1.1 | 25 |

[1]Time required for KPS catalyst to be added after the inner temperature reached 57°C (Hrs.).
[2]The polymerication was stopped at 8 kg/cm² since the inner pressure did not drop well on account of the agglomeration of the content.
[3]See Table 1.

Table 1

| Average polymerization degree ($\bar{p}$) | | Example 1 1,320 | Control 1 1,310 |
|---|---|---|---|
| Particle size distribution (pass %) | 42 mesh | 100 | 100 |
| | 60 " | 99.6 | 99.7 |
| | 100 " | 48.2 | 52.3 |
| | 200 " | 0.8 | 1.1 |
| Plasticizer-retaining amount[1] (g) | | 45 | 29 |
| Time required to wind round rolls (sec)[2] | | 8 | 25 |
| Fish eye[3] | | 0 | 38 |

[1]The values are shown as grams of dioctyl phthalate (which will be hereinafter abbreviated to DOP) attached to polyvinyl chloride after 100 g of polyvinyl chloride was dipped in DOP at 23°C for one hour followed by separating DOP by a centrifugal separater(3000 rpm).
[2]Time required for a blend of 100 parts of polyvinyl chloride, 50 parts of DOP, 5 parts of basic lead sulfate and one part of lead stearate, to be wound round the rolls having each a diameter of 6 inches and a gap of 0.3 mm at 150°C, after dropping thereon.
[3]Number of fish eyes per 1,000 cm² of a film obtained by milling the same blend between the same rolls as in [2] for 10 minutes and then taking out it as a film having a thickness of 0.1 mm.

Example 6 and Control 3

To 200 l capacity polymerization vessel after purging of the air by nitrogen gas, were added 100 l of deionized water, 2.5 kg of 2% methyl cellulose aqueous solution and 7.5 g of 50% toluene solution of IPP. 50 kg of vinyl chloride was added with stirring. The inner temperature was elevated to 57°C, and polymerization was initiated.

After 5 hours, 1 kg of 5% KPS aqueous solution was introduced under a pressure. The amount of KPS added was 0.033% by weight based upon the total weight of the polymerization system. After 10 hours, the inner pressure dropped to 6 kg/cm² gauge. At this point, polymerization was stopped. Unreacted gas was discharged. The resulting polymer was then washed with water, dehydrated and dried. The percentage of polymerization was 89%.

As a control, polymerization was carried out in the same manner as mentioned above except that 15 g of 50% toluene solution of IPP and no KPS was added. After 10.5 hours when the inner pressure dropped to 6 kg/cm², the same treatment as described above was carried out. The percentage of polymerization was 88%.

The properties of both the polymers thus obtained are shown in Table 3.

Table 3

| Average polymerization degree ($\bar{p}$) | | Example 6<br>1,030 | Control 3<br>1,040 |
|---|---|---|---|
| Particle size | 42 mesh | 100 | 100 |
| distribution | 60 " | 99.9 | 99.9 |
| (pass %) | 100 " | 88.5 | 85.2 |
| | 200 " | 1.4 | 1.6 |
| Time of DOP absorption (min.)[1] | | 5 | 28 |
| Foaming | Magnification | 4.2 | 3.6 |
| test[2] | Diameter of maximum foam (mm) | 0.2 | 0.6 |
| | Number of foam (foams/cm²) | 680 | 290 |
| Time of gelation (min.)[3] | | 15 | 40 |

[1]Time required for 100 g of polyvinyl chloride and 50 g of DOP added to a vessel dipped in an oil bath at 80°C, to form an unwetted state through the absorption of DOP by polyvinyl chloride under stirring.
[2] ① Preparation conditions of test piece:
Blending:   polyvinyl chloride   100 parts
            DOP                  85   "
            azodicarbonamide     3    "
            Cd-Ba system stabilizer  2  "
            Cd-Zn system stabilizer  1  "
Making of roll film:
The resulting blend is kneaded at 150°C for 10 minutes to form a sheet having a thickness of 0.5 mm, which is then pressed on a nylon-muslin cloth.
② Foaming conditions:
The test piece thus obtained is maintained for 2 minutes in a geared oven at 200°C and then taken out.
[3]Time required for torque to reach the maximum when the sample is tested by Plastograph (a trademark of plastometer made by Brabender Company) under following conditions:
Blending        polyvinyl chloride   100 parts
components:     DOP                  50   "
                Barium strearate     15   "
                Cadmium strearate    15   "
Temperature:    150°C Example 7 and Controls 4 – 5

To a 200 l capacity polymerization vessel after purging of the air by nitrogen gas were added 100 kg of deionized water, 50 g of polyvinyl alcohol having a saponification degree of 79% and 40 g of 25% toluene solution of acetyl cyclohexylsulfonyl peroxide (which will be hereinafter abbreviated to ACSP) as an oil-soluble catalyst. 47.5 kg of vinyl chloride and 2.5 kg of vinyl acetate were then added with stirring. The temperature was elevated to 48°C and the reaction was initiated. Four hours after the initiation of the reaction, 3% aqueous solution of 100 g ammonium persulfate was introduced under pressure. The amount of ammonium persulfate added was 0.066% by weight based upon the total weight of the polymerization system. When the inner pressure dropped to 6 kg/cm² gauge in 16 hours, the reaction was stopped, and unreacted gas was discharged. A product (sample A) was obtained by the treatment as in Example 1. The percentage of polymerization was 86%. As a control, polymerization was started in the same manner as in the above-described Example except that no ammonium persulfate was used. 16 hours after the start of the reaction, the reaction was terminated (before any drop in the inner pressure was observed). After the same treatment as mentioned above, a sample B was obtained. The percentage of polymerization was 44%. Further, polymerization was initiated in the same manner as the above-mentioned Example except that 80 g of 25% toluene solution of ACSP as an oil-soluble catalyst was used and no water-soluble catalyst was used. 14.5 hours after the start of the reaction, the inner pressure dropped to 6 kg/cm² gauge. At this point, the reaction was terminated and then treated as above. A sample C was obtained. The percentage of polymerization was 85%. The properties of these samples are shown in Table 4.

Table 4

| Example or control | | Example 7 | Control 4 | Control 5 |
|---|---|---|---|---|
| Sample | | A | B | C |
| Average polymerization degree ($\bar{p}$) | | 1,450 | 1,430 | 1,450 |
| Particle size | 42 mesh | 100 | 100 | 100 |
| distribution | 60 " | 99.5 | 99.2 | 99.6 |
| (pass %) | 100 " | 51.4 | 42.8 | 55.3 |
| | 200 " | 1.6 | 2.2 | 1.2 |
| Time of DOP absorption (min.)[1] | | 6 | 6 | 25 |
| Time required for polymer to be wound round rolls (min.)[2] | | 19 | 27 | 32 |
| Fish eye[3] | | 0 | 27 | 44 |

[1] and [2] See Table 1.
[3] See Table 2.

As apparent from the above-mentioned Example and Controls, monomer gas remaining in the particles can be released and also particles rich in porosity can be obtained also in the case of the suspension polymerization by the sole use of the usual oil-soluble catalyst, if polymerization is terminated before the percentage of polymerization will become sufficiently high.

In such a case, however, the percentage of polymerization is reduced, and such process is not commercial. Further, it can be observed that the product according to such process is greatly different from the product prepared according to the process of this invention, in the quality of product such as processability, etc.

Example 8 and Control 6

To 200 l capacity polymerization vessel were fed 100 l of deionized water and 100 g of methyl cellulose. After stirring, the air in the vessel was replaced by vinyl chloride monomer gas. 20% toluene solution of 15 g of ACSP was then added, and just thereafter 50 kg of vinyl chloride monomer was introduced under pressure. The temperature was elevated to 50°C and polymerization was carried out for 4 hours. The temperature was then elevated to 64°C, and 3% aqueous solution of 50 g of KPS was added to continue polymerization. The amount of KPS added was 0.033% by weight based upon the total weight of the polymerization system. When the inner pressure dropped to 6 kg/cm² gauge, the content was cooled, and unreacted monomer was discharged. The resulting polymer was washed with water, dehydrated, and dried. The percentage of polymerization was 89%. The properties of the product (Sample A) thus obtained, as compared with those of a commercial polyvinyl chloride (Sample B), are shown in Table 5.

(Sample A) was obtained. The percentage of polymerization was 87%.

As a control, polymerization was carried out in the same manner as in the above-mentioned Examples except that no aqueous solution of hydroxylamine was used. Nine hours and 50 minutes after the start of the reaction, the inner pressure dropped to 5 kg/cm² gauge. At this point, the reaction was terminated. After the same treatment as mentioned above, a product (Sample B) was obtained. The percentage of polymerization was 87%.

The properties of the Samples A and B together with

Table 5

| Example or Control | | Example 8 | Control 6 |
|---|---|---|---|
| Sample | | A | B |
| Average polymerization degree (p̄) | | 1,100 | 1,080 |
| Particle size | 42 mesh | 100 | 100 |
| distribution | 60 " | 99.8 | 99.8 |
| (pass %) | 100 " | 76.4 | 86.5 |
| | 200 " | 1.6 | 4.2 |
| Plasticizer-retaining amount (g) [1] | | 46 | 26 |
| Time required for polymer to be [2] wound round rolls (sec.) | | 5 | 22 |
| Time of gelation (min.) [3] | | 1.2 | 5.6 |

[1] and [2] See Table 1.
[3] See Table 2.

Examples 9 and 10 and Control 7 those of a commercial polyvinyl chloride (Sample C) are shown in Table 6.

Table 6

| Example or Control | | Example 9 | Example 10 | Control 7 |
|---|---|---|---|---|
| Sample | | A | B | C |
| Average polymerization degree (p̄) | | 1,450 | 1,440 | 1,450 |
| Particle size | 42 mesh | 100 | 100 | 100 |
| distribution | 60 " | 99.8 | 99.8 | 99.9 |
| (pass %) | 100 " | 66.5 | 56.2 | 78.8 |
| | 200 " | 1.4 | 3.1 | 2.6 |
| Plasticizer-retaining[1] amount (g) | | 45 | 41 | 32 |
| Time of gelation (min.)[2] | | 1.3 | 2.4 | 7.8 |
| Henschel mixer-dry up[3] time(min.) | | 8 | 9.5 | 14 |

The testing methods [1] and [2] are same with those described in Example 8.
[3]Time required for torque to reach the maximum when 100 parts of polyvinyl chloride (practical amount used being 4 kg), 80 parts of DOP and 3 parts of Cd-Ba system stabilizer were added to 20l Henschel mixer, and mixed with stirring at 1,980 rpm. (When torque reached the maximum, the surfaces of powders are swollen and dry-up is completed. Actually torque lowers once thereafter, and begins to rise again as gelation proceeds.)

To 5 M³ capacity, glass-lining polymerization vessel, after purging of the air inside the vessel, were added 2600 kg of deionized water, 1300 g of polyvinyl alcohol having a saponification degree of 88% and 500 g of polyethyleneglycol as dispersion-stabilizers, and 400 g of 50% toluene solution of IPP as an oil-soluble catalyst. 1300 kg of vinyl chloride was added with stirring. The temperature was then elevated to 48°C, and the reaction was started. Six hours after the start of the reaction, 5% aqueous solution of 650 g of hydroxylamine was added, and then 3% aqueous solution of 2000 g of ammonium persulfate was introduced under pressure. The amount of ammonium persulfate added was 0.051% by weight based upon the total weight of the polymerization system. Thirteen hours after the start of the reaction, the inner pressure dropped to 5 kg/cm² gauge. At this point, the reaction was terminated, and unreacted monomer gas was discharged. After the same treatment as in Example 1, a product

Example 11 and Control 8

To 200 l capacity stainless steel polymerization vessel were fed 80 kg of deionized water, 40 g of polyvinyl alcohol having a saponification degree of 88%, 40 g of sorbitane monolaurate and 8 g of 50% toluene solution of t-butyl peroxypivalate. After purging of the air in the vessel, 50 kg of vinyl chloride was fed. The temperature was then elevated to 68°C, and polymerization was initiated. Six hours after the start of the polymerization, 600 g of 3% aqeuous solution of ammonium persulfate was introduced under pressure. The amount of ammonium persulfate added was 0.015% by weight based upon the total weight of the polymerization system. The inner pressure dropped to 8 kg/cm² after 10.5 hours. At this point, the reaction was terminated, and a product (Sample A) was obtained by the same treatment as in Example 1. The percentage of polymerization was 88%.

As a control, polymerization was carried out in the same manner as in the above-mentioned Example except that 16 g of 50% toluene solution of t-butyl peroxypivalate was used, and no ammonium persulfate was added in the course of polymerization.

The inner pressure dropped to 8 kg/cm² after 11 hours of the reaction. At this point, the reaction was stopped, and a product (Sample B) was obtained by the same treatment as in the above-mentioned Example. The percentage of polymerization was 87%. The properties of both the samples are shown in Table 5.

Table 7

| Sample | | Example 11 A | Control 8 B |
|---|---|---|---|
| Average polymerization degree ($\bar{p}$) | | 700 | 700 |
| Particle size | 42 mesh | 100 | 100 |
| distribution | 60 " | 99.8 | 99.7 |
| (pass %) | 100 " | 54.2 | 66.8 |
| | 200 " | 0.2 | 0.2 |
| Time of DOP absorption (min.) | | 5 | 32 |
| Fish eye in soft resin blend | | 0 | 45 |
| Fish eye in hard resin blend[1] | | 0 | 52 |

G2[1]Testing method for hard sheet fish eye:

| Blending components: | polyvinyl chloride | 100 parts |
|---|---|---|
| | stabilizer of organotin system | 4 " |
| | barium stearate | 0.5 " |
| | calcium stearate | 0.2 " |
| | slipping agent | 0.5 " |

The above-mentioned components were blended by Henschel mixer, and then extruded from a 40 mm extruder into a film, and the number of fish eye per 100 cm² of the film was counted.

According to the observation by means of a microscope, a large number of translucent particles (which are said to be generally worse in the absorptivity of plasticizer) are existent in sample B of the present Control, and hence it is apparent that each particle is not uniform, whereas no translucent particle is found in sample A of this invention similarly to those in other Examples. This fact accords with a fact that the product prepared according to the present invention does not bring about any formation of fish eye at all, and also it is superior in the absorptivity of plasticizer.

Further, as apparent from the fact that the product prepared according to the present invention contains no fish eye as mentioned above, the product is basically different from a mere blend of polyvinyl chloride prepared according to the conventional suspension polymerization and that prepared according to the emulsion polymerization.

According to the present invention, there can be readily produced particles of polyvinyl chloride containing substantially no fish eye which has been considered to be inevitable in the polyvinyl chloride prepared according to the conventional suspension polymerization.

Further, due to the extremely high plasticizer-retaining amount, a product having a higher blending proportion of plasticizer which has not been found in the polyvinyl chloride prepared according to the conventional suspension polymerization, can be produced.

Furthermore, the product prepared according to the present invention can sufficiently satisfy the requirement of foamed leather that foamed cells must be uniform and fine to make the touch of the product better.

Example 12 and Control 9

Example 12

10 kg of deionized water was fed into a 20 l-capacity stainless steel polymerization reactor, and then 10 g of polyvinyl alcohol having a saponification degree of 80% and 5 g of 20% toluene solution of acetylcyclohexanesulfonyl peroxide (A.C.S.P.) were added. After purging of the atmosphere in the reactor with vinyl chloride gas, 5 kg of vinyl chloride was added with stirring, and temperature was elevated to 42°C to initiate polymerization. After lapse of 8 hours, 3 g of 28% aqueous ammonia, and then 20 g of ammonium persulfate as 5% aqueous solution were added and polymerization was continued. The amount of ammonium persulfate added was 0.13% by weight based upon the total weight of the polymerization system. After 13 hours, polymerization was terminated. After recovery of unreacted vinyl chloride, the content was washed with water and dried. The yield was 85% (Sample A).

Control 9

In a similar manner to that of the above-mentioned Example, 10kg of deionized water, 10 g of polyvinyl alcohol and 6 g of 20% toluene solution of A.C.S.P. were fed, followed by adding 5 kg of vinyl chloride and elevating the temperature to 42°C to initiate polymerization. After lapse of 13 hours, polymerization was terminated and treatment was carried out as mentioned above. The yield was 84%. (Sample B).

The test results relative to Samples A and B are shown in Table 8.

Table 8

| Sample | | | A | B |
|---|---|---|---|---|
| Average polymerization degree | | | 2100 | 2100 |
| Distribution | 42 | Mesh | 100 | 100 |
| of particle sizes | 60 | " | 99.8 | 99.7 |
| (pass %) | 100 | " | 72.7 | 69.5 |
| | 200 | " | 1.2 | 1.1 |
| Absorption time of DOP (min)[1] | | | 7 | 38 |
| Gellation time (min)[2] | | | 0.5 | 11 |

Note: [1]See Table 3 — [1]
[2]See Table 3 — [3]

| Blending components | Polyvinyl chloride | 100 |
|---|---|---|
| | DOP | 70 |
| | Barium stearate | 1.5 |
| | Cadmium stearate | 1.5 |

Temperature: 140°C

What is claimed is:

1. A process for producing a vinyl chloride-containing polymer having improved properties which consists essentially of:
   a. subjecting a polymer feed selected from the group consisting of vinyl chloride or at least 80% by weight vinyl chloride and up to 20% by weight of another vinyl monomer copolymerizable therewith selected from the group consisting of vinyl acetate, vinyl stearate, methyl acrylate, ethyl acrylate, dimethyl maleate, dimethyl fumarate, vinyl octyl ether, vinyl cetyl ether, vinylidene chloride, acrylonitrile, ethylene and propylene to a first polymerization step involving aqueous suspension polymerization:
      1. which uses 100 to 400 parts by weight of water based upon 100 parts by weight of said polymer feed,
      2. at a temperature of 30° to 70°C., 3. in the presence of an oil-soluble radical initiator in an amount of 0.005% to 0.2% by weight based upon the weight of said polymer feed, said oil-soluble radical initiator consisting of at least one member selected from the group consisting of dilauroyl peroxide, dibenzoyl peroxide, di-2-ethylhexyl peroxide, 3,5,5-trimethylhexanoyl peroxide, 2,4-dichlorobenzoyl peroxide, azobisisobutyronitrile, 2,2'-azobis-2,4-dimethylvaleronitrile, 2,2'-azobis-4-methoxy-2,4-dimethylvaleronitrile, isopropyl peroxydicarbonate, disecondary butyl peroxydicarbonate, t-butyl peroxypivalate and acetyl cyclohexylsulfonyl peroxide, b. deactivating said oil-soluble radical initiator when the polymerization in said first step reaches 15% to 80% completion, said deactivation being carried out by the addition of an alkaline substance, c. continuing the polymerization of said polymer feed in a second polymerization step
1. at a temperature of 30° to 70°C.,
2. in the presence of a water-soluble radical initiator which is present in an amount of from 0.02 to 0.2% by weight based upon the total weight of the polymerization system, said water-soluble radical initiator being at least one member selected from the group consisting of potassium persulfate, ammonium persulfate, hydrogen peroxide, and 2,2'-azobis(2-amidino-propane hydrochloride).

2. A process for producing a vinyl chloride-containing polymer having improved properties which consists essentially of:
a. subjecting a polymer feed selected from the group consisting of vinyl chloride or at least 80% by weight vinyl chloride and up to 20% by weight of another vinyl monomer copolymerizable therewith to a first polymerization step involving aqueous suspension polymerization:
2. at a temperature of 30° to 70°C.,
3. in the presence of an oil-soluble radical initiator in an amount of 0.003% to 0.5% by weight based upon the weight of said polymer feed,
b. deactivating said oil-soluble radical initiator when the polymerization in said fist step reaches 15% to 80% completion,
c. continuing the polymerization of said polymer feed in a second polymerization step
1. at a temperature of 30° to 70°C.,
2. in the presence of a water-soluble radical initiator which is present in an amount of more than 0.01% and up to 0.3% by weight based upon the total weight of the polymerization system.

3. A process according to claim 2, wherein said deactivating is carried out by elevating temperature.

4. A process according to claim 3, wherein said deactivating is carried out by addition of an alkaline substance or a reducible substance.

5. A process for producing a vinyl chloride-containing polymer having improved properties which consists essentially of:
a. subjecting a polymer feed selected from the group consisting of vinyl chloride or at least 80% by weight vinyl chloride and up to 20% by weight of another vinyl monomer copolymerizable therewith selected from the group consisting of vinyl acetate, vinyl stearate, methyl acrylate, ethyl acrylate, dimethyl maleate, dimethyl fumarate, vinyl octyl ether, vinyl cetyl ether, vinylidene chloride, acrylonitrile, ethylene and propylene to a first polymerization step involving aqueous suspension polymerization:
1. which uses 100 to 400 parts by weight of water based upon 100 parts by weight of said polymer feed,
2. at a temperature of 30° to 70°C.,
3. in the presence of an oil-soluble radical initiator in an amount of .005% to .2% by weight based upon the weight of said polymer feed, said oil-soluble radical initiator consisting of at least one member selected from the group consisting of dilauroyl peroxide, dibenzoyl peroxide, di-2-ethylhexyl peroxide, 3,5,5-trimethylhexanoyl peroxide, 2,4-dichlorobenzoyl peroxide, azobisisobutyronitrile, 2,2'-azobis-2,4-dimethylvaleronitrile, 2,2'-azobis-4-methoxy-2,4-dimethylvaleronitrile, isopropyl peroxydicarbonate, disecondary butyl peroxydicarbonate, t-butyl peroxypivalate and acetyl cyclohexylsulfonyl peroxide, and, when said first polymerization step has reached a percentage of completion within the range of 15 – 80%., and then
b. continuing the polymerization of said polymer feed in a second polymerization step
1. at a temperature of 30° to 70°C.,
2. in the presence of a water-soluble radical initiator which is present in an amount of from 0.02 to 0.2% by weight based upon the total weight of the polymerization system, said water-soluble radical initiator being at least one member selected from the group consisting of potassium persulfate, ammonium persulfate, hydrogen peroxide, and 2,2'-azobis (2-amidino-propane hydrochloride).

6. A process for producing a vinyl chloride-containing polymer having improved properties which consists essentially of:
a. subjecting a polymer feed selected from the group consisting of vinyl chloride or at least 80% by weight vinyl chloride and up to 20% by weight of another vinyl monomer copolymerizable therewith to a first polymerization step involving aqueous suspension polymerization:
1. which uses 100 to 400 parts by weight of water based upon 100 parts by weight of said polymer feed,
2. at a temperature of 30° to 70°C.,
3. in the presence of an oil-soluble radical initiator in an amount of 0.003% to 0.5% by based upon the weight of said polymer feed, and, when said first polymerization step has reached a percentage of completion within the range of 15 – 80%., and then
b. continuing the polymerization of said polymer feed in a second polymerization step
1. at a temperature of 30° to 70°C.,
2. in the presence of a water-soluble radical initiator which is present in an amount of more than 0.01% and up to 0.3% by weight based upon the total weight of the polymerization system.

* * * * *